US012561436B2

(12) United States Patent
Nazari et al.

(10) Patent No.: US 12,561,436 B2
(45) Date of Patent: Feb. 24, 2026

(54) STORAGE SYSTEM WITH CLOUD ASSISTED RECOVERY

(71) Applicant: NVIDIA CORPORATION, Santa Clara, CA (US)

(72) Inventors: Siamak Nazari, Mountain View, CA (US); David Dejong, Fremont, CA (US); Srinivasa Murthy, Cupertino, CA (US); Shayan Askarian Namaghi, San Jose, CA (US); Roopesh Tamma, San Ramon, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 18/115,211

(22) Filed: Feb. 28, 2023

(65) Prior Publication Data

US 2023/0273861 A1 Aug. 31, 2023

Related U.S. Application Data

(60) Provisional application No. 63/316,081, filed on Mar. 3, 2022, provisional application No. 63/314,970, filed (Continued)

(51) Int. Cl.
*G06F 11/00* (2006.01)
*G06F 9/4401* (2018.01)
(Continued)

(52) U.S. Cl.
CPC .......... *G06F 21/566* (2013.01); *G06F 9/4403* (2013.01); *G06F 9/4416* (2013.01); *G06F 11/1446* (2013.01); *G06F 2221/033* (2013.01)

(58) Field of Classification Search
CPC .... G06F 11/1451; G06F 2201/84; G06F 8/63; G06F 11/1469
See application file for complete search history.

(56) References Cited

U.S. PATENT DOCUMENTS 7,827,350 B1 11/2010 Jiang et al.
8,326,803 B1 12/2012 Stringham
(Continued)

FOREIGN PATENT DOCUMENTS

CN 112416860 A 2/2021
WO 2021150563 A1 7/2021
WO 2021150576 A1 7/2021

OTHER PUBLICATIONS

Non-Final Office Action issued in U.S. Appl. No. 18/116,740, dated Mar. 25, 2024.

(Continued)

*Primary Examiner* — Amine Riad
(74) *Attorney, Agent, or Firm* — Hogan Lovells US LLP

(57) ABSTRACT

A cluster storage system including servers containing storage processing units (SPUs) can create synchronized snapshot sets for the volumes that the SPUs maintain and can report the snapshot sets to a cloud-based service. Each snapshot in a set reflects the state a corresponding volume had at a rollback point corresponding to the set. A user of the storage system contacts the cloud-based service about recovery of the storage system, and the cloud-based service may present the user with a list of rollback points corresponding to the synchronized snapshot sets. The user may select to recover the storage system to any of the rollback points, and the SPUs promote the selected snapshots to replace the volumes for storage services.

20 Claims, 3 Drawing Sheets

Related U.S. Application Data on Feb. 28, 2022, provisional application No. 63/314,987, filed on Feb. 28, 2022, provisional application No. 63/314,996, filed on Feb. 28, 2022.

(51) Int. Cl.
  *G06F 11/1446*     (2026.01)
  *G06F 21/56*      (2013.01)

(56)         References Cited

U.S. PATENT DOCUMENTS

| | | | |
|---|---|---|---|
| 8,886,995 | B1 | 11/2014 | Pallapothu et al. |
| 9,588,847 | B1 | 3/2017 | Natanzon et al. |
| 9,842,117 | B1 | 12/2017 | Zhou et al. |
| 10,514,989 | B1 | 12/2019 | Borodin et al. |
| 11,307,935 | B2 | 4/2022 | Keller et al. |
| 11,327,844 | B1 * | 5/2022 | Aquino ................. G06F 3/0689 |
| 11,620,070 | B2 * | 4/2023 | Balasubramanian ........................ G06F 16/2379 711/162 |
| 2004/0019823 | A1 * | 1/2004 | Gere ................... G06F 11/1433 714/13 |
| 2004/0250033 | A1 | 12/2004 | Prahlad et al. |
| 2009/0013012 | A1 | 1/2009 | Ichikawa et al. |
| 2010/0179959 | A1 | 7/2010 | Shoens |
| 2010/0299309 | A1 * | 11/2010 | Maki ................... G06F 11/1479 718/1 |
| 2012/0317079 | A1 | 12/2012 | Shoens et al. |
| 2013/0166863 | A1 | 6/2013 | Buragohain et al. |
| 2014/0258239 | A1 | 9/2014 | Amlekar et al. |
| 2015/0286695 | A1 | 10/2015 | Kadayam et al. |
| 2016/0132396 | A1 | 5/2016 | Kimmel et al. |
| 2016/0205182 | A1 | 7/2016 | Lazar et al. |
| 2017/0031769 | A1 | 2/2017 | Zheng et al. |
| 2017/0123657 | A1 | 5/2017 | B |
| 2017/0123700 | A1 | 5/2017 | Sinha et al. |
| 2020/0272544 | A1 | 8/2020 | Carvelli et al. |
| 2020/0341855 | A1 | 10/2020 | Tanwer et al. |
| 2020/0379646 | A1 | 12/2020 | Blau et al. |
| 2021/0133328 | A1 | 5/2021 | Wu |
| 2021/0216408 | A1 | 7/2021 | Huskisson et al. |
| 2021/0224161 | A1 | 7/2021 | Wang et al. |
| 2022/0263897 | A1 | 8/2022 | Karr et al. |
| 2022/0350492 | A1 | 11/2022 | Beedu et al. |
| 2023/0132591 | A1 | 5/2023 | Karr et al. |
| 2023/0325285 | A1 * | 10/2023 | O'Connor ........... G06F 11/1448 |

OTHER PUBLICATIONS

Final Office Action issued in U.S. Appl. No. 18/116,740, dated Jul. 29, 2024.

Non-Final Office Action issued in U.S. Appl. No. 18/116,740, dated Oct. 22, 2024.

Notice of Allowance issued in U.S. Appl. No. 18/116,740, dated Jan. 28, 2025.

* cited by examiner

400

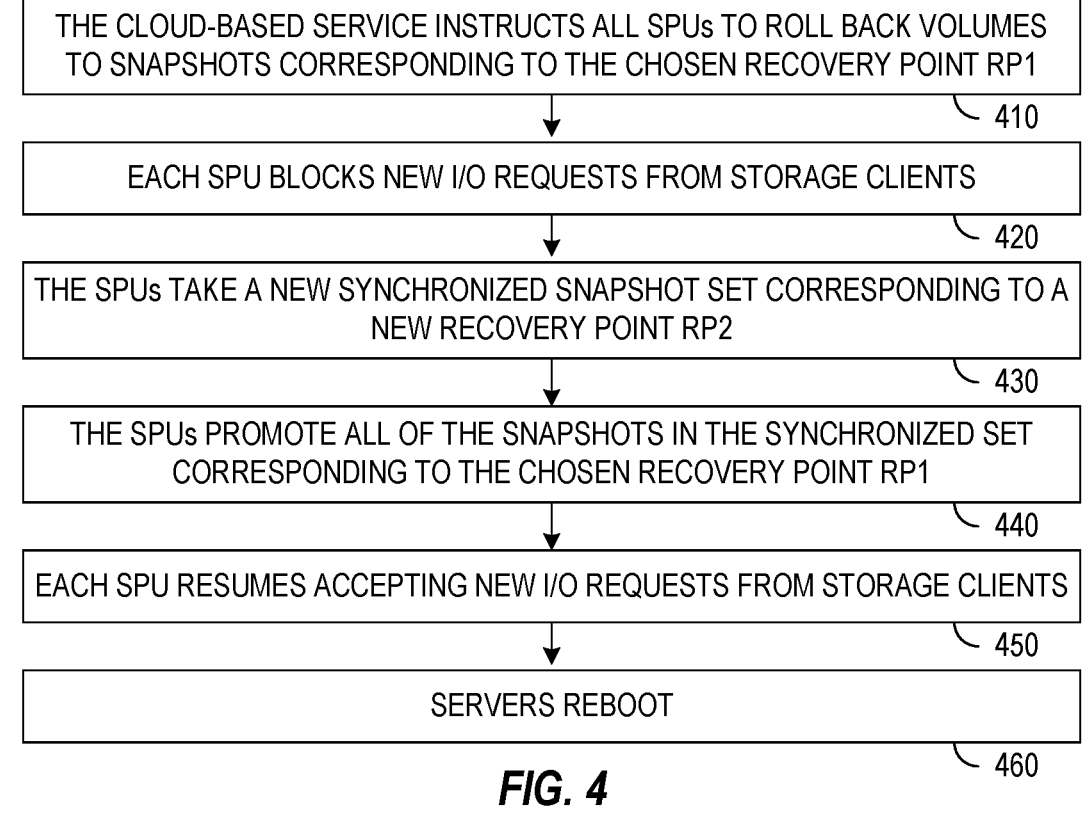

THE CLOUD-BASED SERVICE INSTRUCTS ALL SPUs TO ROLL BACK VOLUMES TO SNAPSHOTS CORRESPONDING TO THE CHOSEN RECOVERY POINT RP1

410

EACH SPU BLOCKS NEW I/O REQUESTS FROM STORAGE CLIENTS

420

THE SPUs TAKE A NEW SYNCHRONIZED SNAPSHOT SET CORRESPONDING TO A NEW RECOVERY POINT RP2

430

THE SPUs PROMOTE ALL OF THE SNAPSHOTS IN THE SYNCHRONIZED SET CORRESPONDING TO THE CHOSEN RECOVERY POINT RP1

440

EACH SPU RESUMES ACCEPTING NEW I/O REQUESTS FROM STORAGE CLIENTS

450

SERVERS REBOOT

STORAGE SYSTEM WITH CLOUD ASSISTED RECOVERY

CROSS-REFERENCE TO RELATED APPLICATIONS

This patent document is a claims benefit of the earlier filing date of U.S. provisional Pat. App. No. 63/314,970, filed Feb. 28, 2022, U.S. provisional Pat. App. No. 63/314,987, filed Feb. 28, 2022, U.S. provisional Pat. App. No. 63/314,996, filed Feb. 28, 2022, and U.S. provisional Pat. App. No. 63/316,081, filed Mar. 3, 2022, all of which are hereby incorporated by reference in their entirety.

BACKGROUND

Malware is malicious software that is intended to cause harm to a user, a system, or a network. Some malwares such as viruses may try to corrupt the operating system, applications, or other software components of a computer system and may take control of a computer system, cause the computer system to take actions against a user's wishes, or steal user information, passwords, or data. Some other types of malwares such as ransomware may attack a computer system by encrypting user data trying to prevent the user from accessing the data unless the user pays a ransom. Antivirus software has been developed that attempts to detect and prevent the activities of malware or undo damage that malware has done.

Recovery of a storage system from a malware attack may attempt to roll a storage system back to a state the system had before the malware attack. For example, a snapshot may be taken of a storage volume, so that the volume may be rolled back to a state before malware activity. A snapshot is generally a copy of a base volume as the base volume was at a time the snapshot was created, and a recovery operation may "promote" a snapshot to replace the current version of the base volume with the earlier version that the snapshot copied, but a snapshot may be encrypted or corrupted or not depending on whether the snapshot was taken before or after the base volume was encrypted or corrupted. Recovery may be unsuccessful if no snapshot remains that was taken before the malware activity.

Storage systems face additional complexity in roll back operations when multiple volumes are involved. For a multi-volume rollback, rolling the base volumes back to respective snapshots may create data inconsistencies among the rolled-back volumes and may not leave a computer system in a stable or operable configuration. Accordingly, improvements in the recovery of complex computers systems are needed.

BRIEF DESCRIPTION OF THE DRAWINGS

FIG. 4 is a flow diagram of a rollback process using a cloud-based service and one or more storage processing units in a storage system in accordance with an example of the present disclosure.

The drawings illustrate examples for the purpose of explanation and are not of the invention itself. Use of the same reference symbols in different figures indicates similar or identical items.

DETAILED DESCRIPTION

Figure 1:
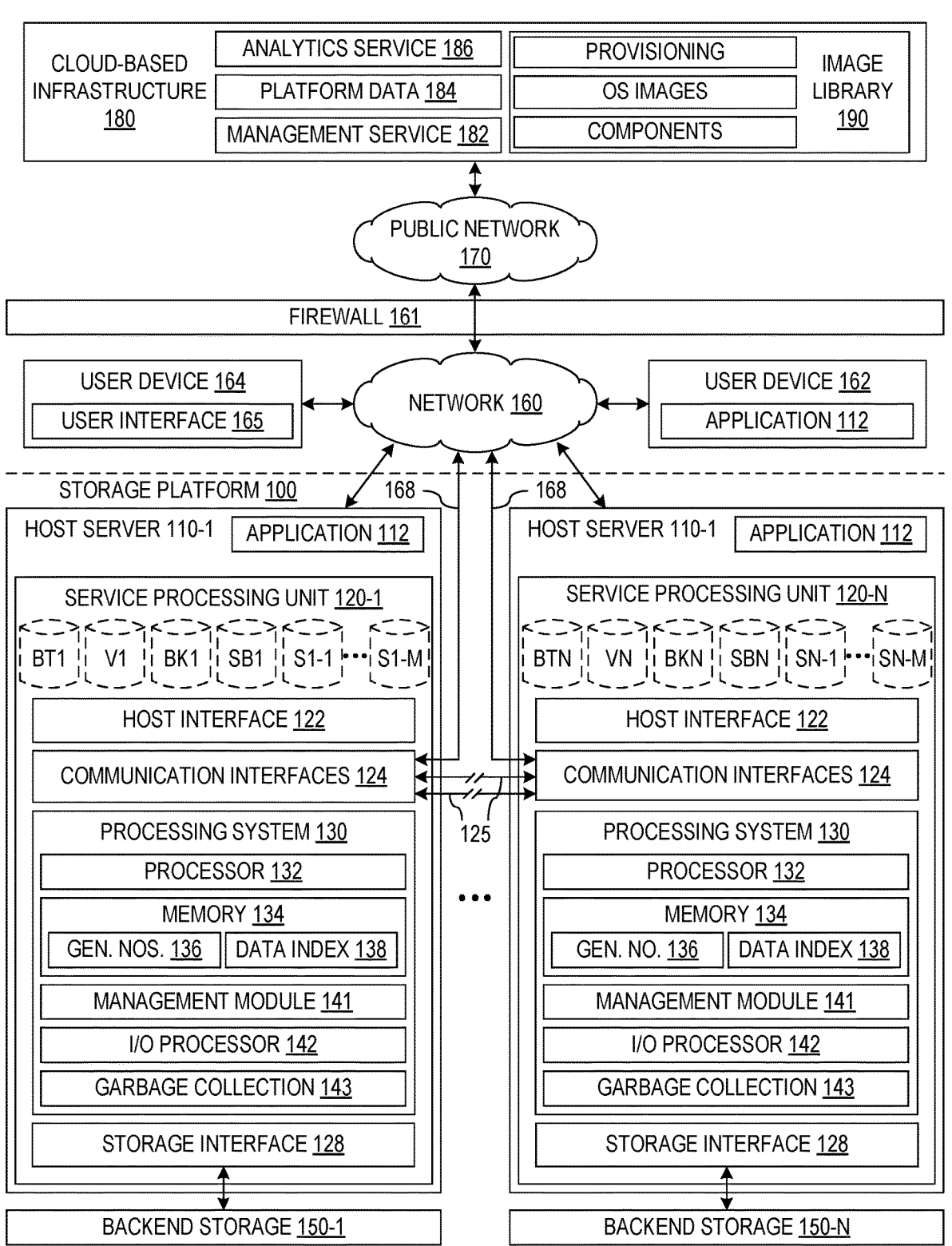
FIG. 1 is a block diagram illustrating an architecture for a storage system with cloud-based assisted recovery in accordance with one example of the present disclosure.

In accordance with an aspect of the invention, a cluster storage system has a recovery functionality, sometimes referred to herein as "big red button" functionality, that allows the entirety or a portion of the complex storage system to revert quickly and reliably to a previously known good state. The recovery functionality may at least partially be implemented through a cloud-based management system for the storage system that during normal operation may be used to configure or update the storage system and analyze activity of the storage system. The cloud-based management system may additionally maintain or extract from the storage system information that enables the recovery functionality for the storage system. The recovery functionality may be used, for example, in the case of massive corruption such as encryption or corruption of multiple volumes, storage nodes, or an entire storage system by ransomware or other malware. During a recovery operation, the cloud-based management system can contact storage processing units in servers or storage nodes of the storage system and direct the storage processing units to perform specific recovery processes. The recovery processes may include recovery of operating systems and components or applications if host servers of the cluster storage system boot from the cluster storage system and also include recovery of data to an uncorrupted and accessible state. The scope of the "rollback" may include a single host server or storage node in the storage system, one or more groups of host servers or storage nodes, or an entire cluster of storage nodes.

In accordance with one example of the present disclosure, a cluster storage system uses a snapshot schedule for taking sets of synchronized snapshots that cover every data volume that the cluster storage system currently exports to storage clients. The snapshots in each set are generally synchronized in time or may be synchronized along a sequence of I/O operations. In one example, snapshots in a synchronized set for a storage node may be synchronized to the same point along the sequence of I/O operations of the storage node, and the synchronized sets in different storage nodes may be more loosely synchronized in time, e.g., according to the snapshot schedule. Synchronization along the I/O sequence may guarantee data consistency in the case of dependent writes to different volumes in the storage node, but data consistency is not critical if dependent writes are not an issue for volumes in different storage nodes. In another example, synchronized sets in different storage nodes may be synchronized along an I/O operation sequence for the entire storage platform. Each snapshot in a set of snapshots may correspond to the same recovery point associated with a snapshot schedule for the storage platform, and the storage nodes may collectively take snapshots at the same scheduled time for all volumes that the storage platform exports to storage clients.

In accordance with another example of the present disclosure, storage nodes in a storage system may take (and maintain) one or more snapshots of boot volumes with the snapshots being taken at specific points or milestones in a boot process. For example, boot volume snapshots may be taken when a clean operating system image is written into the boot volume from a reliable source such as a cloud-based management system for the storage system, when component or application images from a reliable source are written into the boot volume for a boot process, and immediately after a host server finishes a successful boot process installing the components from the boot volume containing the clean operation system and component images. A storage node can be configured to rollback its boot volume to any of the boot volume snapshots, either before every reboot of its host server or as part of a recovery operation, to ensure that the host server boots into a known usable and uncorrupted state.

FIG. 1 is a block diagram illustrating a storage architecture including a storage platform 100 in accordance with one example of the present disclosure. Storage platform 100 includes one or more host servers 110-1 to 110-N, which are sometimes generically referred to herein as host server(s) 110. Each host server 110 may be a conventional computer or other computing system including one or more central processing unit (CPU), memory, and interfaces for connections to internal or external devices. FIG. 1 shows host servers 110-1 to 110-N having respective service or storage processing units (SPUs) 120-1 to 120 N, which are sometimes generically referred to herein as SPU(s) 120. SPUs 120-1 to 120-N may be installed in respective host servers 110-1 to 110-N, e.g., as daughterboards attached to the motherboards of servers 110. More generally, in different configurations, storage platform 100 may include one or more host servers 110, with each server 110 hosting one or more SPUs 120. A minimum configuration of storage platform 100 may include a single host server 110 in which one SPU 120 resides. To improve redundancy, storage platform 100 may be a cluster storage system using at least two host servers 110 or at least two SPUs 120, but more generally, a limitless number of different configurations are possible containing any number of host servers 110 and any number of SPUs 120. Storage platform 100 may accordingly be scaled to larger storage capacities by adding more SPUs 120 with associated backend storage.

Each SPU 120 has hardware including a host interface 122, communication interfaces 124, a storage interface 128, and a processing system 130. Host interface 122 provides communications between the SPU 120 and its host server 110. For example, each SPU 120 may be installed and fully resident in the chassis of an associated host server 110, and each SPU 120 may be a card, e.g., a PCI-e card, or printed circuit board with a connector or contacts that plug into a slot in a standard peripheral interface, e.g., a PCI bus in its host server 110. Host interface 122 may include circuitry that complies with the protocols of the host server bus.

Communication interfaces 124 in an SPU 120 provide communications with other SPUs 120 and to other network connected devices. Multiple SPUs 120, e.g., SPUs 120-1 to 120-N in FIG. 1, may be interconnected using high speed data links 125, e.g., one or more parallel 10, 25, 50, 100 or more Gbps Ethernet links, that form a dedicated data network for a pod or cluster of SPUs 120 in storage platform 100. Data links 125 may particularly form a high-speed data network that is independent of a private network 160 of the enterprise or other user of storage platform 100. Communication interfaces 124 may also allow each SPU 120 to communicate through private network 160 with user devices 162 and 164 on private network 160 and through private network 160, a firewall 161, and a public network 170, e.g., the Internet, to communicate with a remote, cloud-based infrastructure 180.

Storage interfaces 128 in SPUs 120-1 to 120-N includes circuitry and connectors for attachment to devices of respective backend storage 150-1 to 150-N, sometimes generically referred to herein as backend or persistent storage 150. Each of SPU 120 may thereby control its backend storage 150. Backend storage 150 may employ, for example, hard disk drives, solid state drives, or other nonvolatile/persistent storage devices or media in which data may be physically stored, and backend storage 150 particularly may have a redundant array of independent disks (RAID) 5 or 6 configuration for performance and redundancy.

Processing system 130 in an SPU 120 includes one or more microprocessors, microcontrollers, or CPUs 132 with memory 134 that the SPU 120 employs to control one or more physical storage devices of backend storage 150 and to provide storage services to storage clients. In the illustrated example, processing system 130 particularly implements a set of modules including a management module 141, I/O processor 142, and garbage collection module 143. In other examples, SPU 120 may additionally implement modules that provide other storage functions such as data deduplication, encryption and decryption, or compression and decompression. PCT Pub. No. WO 2021/150576 A1, entitled "Primary Storage with Deduplication" describes some examples of storage systems with additional storage functions such as deduplication and is hereby incorporated by reference in its entirety.

Management module 141 of an SPU 120 may control processes such as setup or configuration of the SPU 120, snapshot operations for capture of synchronized snapshots, or reporting processes transmitting snapshot information or I/O information to cloud-based infrastructure 180. In accordance with an aspect of the present disclosure, management module 141 can communicate with other SPUs 120 to coordinate capture of a set of snapshots that are synchronized across storage platform 100 and can communicate to cloud-based infrastructure 180 information regarding synchronized snapshots taken or maintained in storage platform 100.

Cloud-based infrastructure 180 may include a computer or server that is remotely located from host servers 110 and user devices 162 and 164. Cloud-based infrastructure 180 may execute a management service 182 capable of automating configuration and management tasks to thereby reduce the burden of storage management on an enterprise using storage platform 100. Management service 182 can, for example, provide SPUs 120 with software images, configuration setting, and operating instructions and thus allows an enterprise to offload the burden of setup and management of storage platform 100 to an automated process that cloud-based management infrastructure 180 and the SPUs 120 execute. Management service 182, during a setup process, may determine an allocation of storage volumes to meet the needs of an enterprise or other users of storage platform 100, distributed the allocated volumes to SPUs 120-1 to 120-N, and create recipes for SPUs 120 to execute to bring storage platform 100 to a working configuration such as illustrated in FIG. 1. For these purposes, cloud-based infrastructure 180 may maintain an image library 190 contain operating system images, component images, and provisioning information that may be applicable to different storage platform configurations. After setting up platform 100, management service 182 may reconfigure SPUs 120 in storage platform 100, monitor the performance of storage platform 100, and record platform information including information concerning snapshots in storage platform 100 or I/O information for an analysis services 186. Platform data 184 kept by cloud-based infrastructure 180 may indicate characteristics of storage platform 100, including what hardware, operating systems, and applications are included in or served by storage platform 100, provisioning information identifying the characteristics of the volumes that storage platform 100 maintains, and information concerning a snapshot schedule and the snapshots that storage platform 100 takes and maintains. For malware detection, management service 182 may also employ analytics module 186 to analyze I/O activity in storage platform 100, and analysis module 186 may detect suspected malware activities such as encrypting data for ransom.

FIG. 1 illustrates storage platform 100 after SPUs 120-1 to 120-N have been set up to provide storage services to storage clients via virtual volumes or logical unit numbers (LUNs). FIG. 1 particularly shows SPU 120-1 provides storage services relating to a boot volume BT1 and one or more other virtual volumes V1, and SPU 120-N provides storage services relating to a boot volume BTN and one or more other virtual volumes VN. Boot volumes BT1 to BTN may be "unshared" virtual volumes and only used by respective host servers 110-1 to 110-N, e.g., when the host server 110 is powering up or rebooting. Other virtual volumes V1 to VN may be used for general storage services and may be configured according to the requirements of storage platform 100. SPU 120-1 is sometimes referred to as "owning" virtual volumes BT1 and V1 in that SPU 120-1 is normally responsible for fulfilling I/O requests that are directed at any of volumes BT1 and V1. Similarly, SPU 120-N owns virtual volumes BTN and VN in that SPU 120-N is normally responsible for fulfilling I/O requests that are directed at any of virtual volumes BTN and VN. In addition to maintaining the data for their owned volumes, SPUs 120-1 to 120-N may also maintain data for respective sets of backup virtual volumes BK1 to BKN that mirror base virtual volumes that other SPUs 120 own.

In accordance with an example of the present disclosure, each SPU 120 maintains a set of milestone snapshots for its boot volume and maintains one or more synchronized sets of snapshots for other volumes. Each synchronized snapshot set preserves the states that all owned virtual volumes and the backup virtual volumes of the SPU 120 had at the same recovery point. More specifically, in the example of FIG. 1, SPUs 120-1 maintain a number M of synchronized snapshot sets S1-1 to S1-M, with each of synchronized snapshot sets S1-1 to S-M including snapshots of all virtual volumes V1 and all backup volumes BK1 that SPU 120-1 owns or maintains. Similarly, SPUs 120-N maintain M synchronized snapshot sets SN-1 to SN-M, with each of snapshot sets SN-1 to SN-M including snapshots of all base virtual volumes VN and all backup virtual volumes BKN that SPU 120-N owns or maintains. Further, SPU 120-1 takes snapshot sets S1-1 to S1-M at the same times T1 to TM that SPU 120-N takes respective snapshot sets SN-1 to SN-M. In alternative examples of the present disclosure, boot volume snapshot sets SB1 to SBN may include snapshots taken at times T1 to TM for synchronization with the data volume snapshot sets or may logically preserve the states that boot volumes BT1 to BTN had at specific milestones during boot operations as described above.

Some examples of the present disclosure perform I/O operations that allow near instantaneous capture of snapshots without requiring any copying or other operations in the physical storage of backend storage 150. I/O processors

142 in SPUs 120-1 to 120-N are generally responsible for performing the I/O operations and generally perform I/O operations in response to storage service requests targeting the virtual volumes that the SPUs 120-1 to 120-N own. In some implementations of storage platform 100, storage clients, e.g., applications 112 running on a host server 110 or a user device 162 or 164, may request storage service through an SPU 120 resident in the host server 110 associated with the storage client. The I/O processor 142 of the resident SPU 120 may receive the storage service request and provide the requested storage service if the SPU 120 owns the targeted virtual volume or may forward the storage service request through data network 125 to another SPU 120, e.g., to the SPU 120 that owns the virtual volume that the storage service requests targeted.

In accordance with an example of the current disclosure, each I/O processor 142 maintains a set of generation numbers 136, each generation number corresponding to an associated virtual volume, and the I/O processor 142 uses a current value of the generation number for a virtual volume to tag and uniquely distinguish each I/O process that changes the content of that virtual volume. For example, for each write request that SPU 120-1 receives requesting writing of data to an address or offset in a virtual volume V1, the I/O processor 142 of SPU 120-1 may increment the generation number 136 for the volume V1 and tag (or otherwise identify) the write request using the current value of generation number 136 for the virtual volume V1. The next write request to volume V1 is tagged with the next value of generation number 136.

I/O processor 142, during each write operation, may record in a data index 138 an entry in which the generation number and volume/offset of the write operation are mapped to the storage locations where write data is stored in backend storage 150. Data index 138 may be any type of database, but in one example of the present disclosure, data index 138 is a key-value store where entries in data index 138 include a key and a value. The key in each entry of data index 138 contains a generation number of a write operation and a volume ID and offset or address in the virtual volume the write operation targeted, and the value in the entry indicates the location in backend storage 150 containing the data pattern written. When reading from a base volume, I/O processor 142 may query data index 138 to find all entries that correspond to the volume/offset to be read and of those entries uses the entry having the newest generation number to identify where the requested data is in backend storage 150. The entries having older generation numbers may be required snapshots or may be garbage that garbage collection module 143 can (at some point) identify and reclaim for storage of new data. When reading from a snapshot, I/O processor 142 may query data index 138 to find the entries that correspond to the volume/offset to be read and of those entries use the entry having the newest generation number that is at least as old as the snapshot, and any entries newer than the snapshot are ignored. Garbage collection module 143 acts to preserve any entries in data index 138 and corresponding stored data in backend storage 150 that may be needed for reading any virtual volume or snapshot. Garbage collection module 143 can reclaim entries and identified data in backend storage 159 that are not needed for any virtual volume or snapshot.

An SPU 120 can take a snapshot of a volume simply by assigning to the snapshot a generation number that the volume has when the snapshot was taken and then creating a metadata structure, sometimes referred to herein as a view or more specifically a static view, that garbage collection module 143 can interpret in order to maintain entries in data index 138 and data in backend storage 150 needed for the snapshot. The I/O processor 142 can similarly interpret the static view of a snapshot when reading data that is in the snapshot. An SPU can complete a snapshot operation and take a snapshot without any copy or other operation of physical storage in backend storage 130, making snapshot operations nearly instantaneous. PCT Pub. No. WO 2021/150563, entitled Efficient IO Processing in a Storage System with Instant Snapshot, XCopy, and Unmap Capabilities," discloses storage systems and methods for storage system near instantaneous storage operations such as snapshots and is hereby incorporated by reference in its entirety.

In one example of the present disclosure, storage platform 100 may create a snapshot of a volume V by injecting a static view request in the I/O stream of the SPU 120 that owns the volume V. When the I/O processor 142 picks up any modify-type I/O request, e.g., a write, xcopy, writesame, unmap, or staticview request, the I/O processor 142 tags the I/O request with a generation number 136. When a static view request is tagged with a generation number in this manner, the static view indicates that any I/O operations tagged with generation numbers less than that of the static view are visible to the snapshot and any I/O operations tagged with a higher generation number are not visible to the snapshot.

In order to provide system-wide snapshots, synchronized snapshot sets, e.g., snapshot sets S1-1 to SN-1, need to capture dependent I/O operations. Dependent I/O operations may arise if some applications use multiple volumes for their data. As an example, Oracle applications can use one volume for a log and another volume for data, and an application might write to a log volume first and then the data volume. The write to the log volume commits the transaction, and the write to the data volume can be recovered based on the log. Thus, the application has a dependent write, e.g., the log write completes and then the data write happens. When taking synchronized snapshots of all the volumes of an SPU or storage platform, if the snapshot of the log volume is before the log write is written, and snapshot of the data volume is after the data write, the two snapshots would be inconsistent. If a recovery operation that restores the system to the state represented by those two snapshots, the application would start up with an inconsistent state. To avoid such inconsistency, a system-wide snapshot may pause commencement of new I/O operations and complete pending I/O operations to all volumes before taking snapshots and then resume accepting new I/O operations after the snapshots are taken.

Processing of a static view request has an additional complication. When an SPU 120 creates a static view, e.g., for a snapshot, the static view may inherit any source views associated with the base volume. (Prior operations such as xcopy, unmap, or write-same may create the source views.) This means that requests that create source view and static view requests need to be processed in the same order on the owner SPU and the backup SPU. As an example, an xcopy request may have generation number 100, and a static view that follows the xcopy request may have a generation number 101. The owner SPU 120 processes the xcopy request and then processes the static view request. The static view at generation number 101 inherits the xcopy at 100 on the owner SPU 120. The two requests are also forwarded to the backup SPU, but because network transmissions cannot guarantee the order or receipt of the requests, the backup SPU may receive and processes the requests in any order. In particular, if the backup processes the static view first and creates the static view, and then processes the xcopy request, the source view created by the xcopy will not be inherited by the static view. Thus, the owner static view sees the xcopy while the backup static view will not, causing inconsistency between the owner and the backup as to the contents of the snapshot. To solve this problem, transmission of static view requests may be delayed until the backup acknowledges completing the prior requests. In any case, snapshot operations may still be nearly instantaneous since operations that changes views only write metadata in SPUs and does not require copying of large amounts of data in backend storage 150.

An SPU 120 can also nearly instantaneously promote a snapshot of a volume so that data from the snapshot replaces the current data of the volume. The promote may be conducted as a copy operation such as an XCOPY with the source for the copy operation being the snapshot and the destination for the copy operation being the entire base virtual volume. For one simplified example of a promote operation, SPU 120 creates a metadata structure, sometimes referred to herein as a view. The view may indicate to the I/O processor 142 read operations directed at the volume should ignore data index entries having generation numbers that are between the generation number of the snapshot being promoted and a later generation number that the volume had when the view was created. The garbage collection module 143 can interpret view data structure when identifying and reclaiming entries in data index 138 and data in backend storage 150 that are no longer needed.

Figure 2:
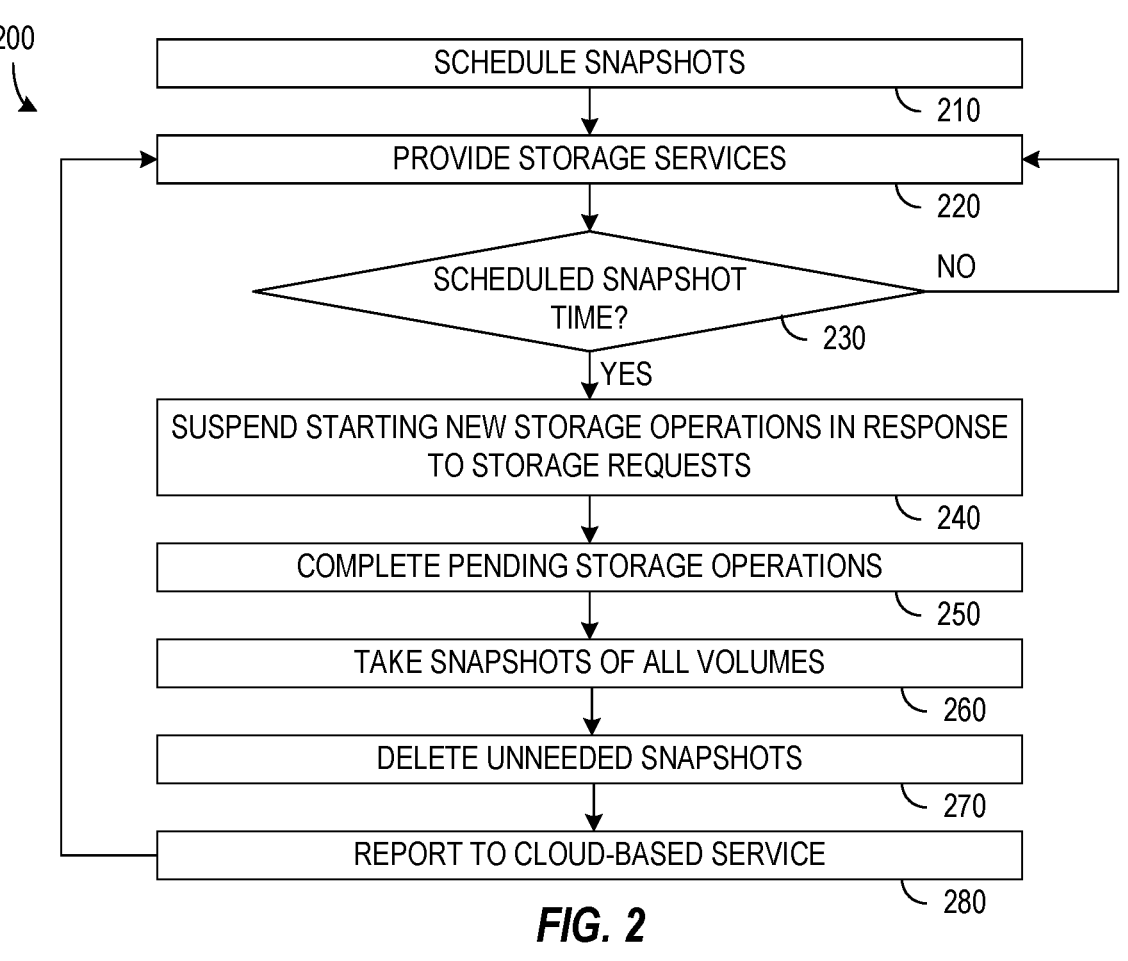
FIG. 2 is a flow diagram of a process in which a storage system captures a snapshot set corresponding to a recovery point in accordance with an example of the present disclosure.

A recovery operation in accordance with an example of the present disclosure may be based on sets of synchronized snapshots as described above, and FIG. 2 is a flow diagram of a process 200 for operating a storage system that generates and maintains the synchronized snapshot sets. Process 200 may start with a process block 210 in which a schedule for the synchronized snapshots is set up. A user or administrator of the storage system may select a schedule that meets the demands or concerns of the user or administrator. In a cluster storage system, the schedule applies to all storage nodes, e.g., all SPUs 120 in storage platform 100 of FIG. 1. The selected schedule may include different types of synchronized snapshot sets that may be taken at different frequencies and maintained for different time periods. For example, a storage system may be configured to take weekly snapshots that the storage system maintains one or more months, daily snapshots that the storage system maintains for one or more weeks, and hourly snapshots that the storage system maintains for up to a day or more, and more frequent snapshots that may be maintained for an hour or less. Scheduling snapshots in process block 210 may be performed when a storage system is set up or at any time thereafter. With the snapshots scheduled, a storage system conducts, in a process block 220, its normal operations of providing storage services. Providing storage services may include receiving storage service requests, e.g., write requests and read requests from storage clients, and performing storage operations to fulfill the storage service requests.

The storage system, while providing storage services, may perform a process 230 and check whether it is time for taking a set of synchronized set of snapshots. If so, the storage system may perform a process 240 to suspend starting any new storage operations in response to new service requests from storage clients. (Alternatively, SPUs 120 may not need to suspend storage services if snapshots are all taken within a sufficiently small window or time and dependent write operations are not an issue.) In a process block 250, the storage system completes any pending storage operation. In particular, process block 250 may include a storage node completing any storage operations that started before the scheduled time for the snapshot and completing any storage operations that are in response to other storage nodes, e.g., when one SPU 120 in storage platform 100 of FIG. 1 instructs another SPU 120 to update a backup volume. In one example of the present disclosure, the SPUs in a storage platform are network connected but not rigidly synchronized to each other, and each SPU controls when snapshot its volumes. In this example, the times at which different SPUs snapshot their volumes may correspond to same time in the snapshot schedule but may differ slightly. In an alternative example, the SPUs may all synchronize snapshots to a point in an ordered sequence of I/O request for the entire system.

In a snapshot process 260, the storage system takes snapshots of all of its volumes or all of its volumes that are not boot volumes. Even if snapshot timing is not identical, a limit may be placed on the allowed difference, and an error or warning may be issued if any exported volumes don't have a snapshot within a desired tolerance, e.g., within a five-minute window. As described further below, a cloud-based management service can provide an API that allows selection from among available recovery points and may warn a user about lack of alignment of snapshots or may not consider a snapshot set as providing a recovery point if snapshots in the snapshot set are not sufficiently aligned. If a snapshot set does not include snapshots for all relevant volumes at a recovery point, e.g., if a user deleted a snapshot, the snapshot set may be disqualified as providing a possible recovery point.

A process 270 may include deleting any old snapshots that the schedule indicates are or will no longer be needed after process 260 takes a set of snapshots. In one example of the present disclosure, the storage system may perform a reporting process 280 to report to a cloud-based service which synchronized snapshot sets are currently being maintained. The storage system may resume providing storage services any time after the taking of snapshots in process block 260, deleting unneeded snapshots in process block 270, or reporting to the cloud service in process block 280.

Figure 3:
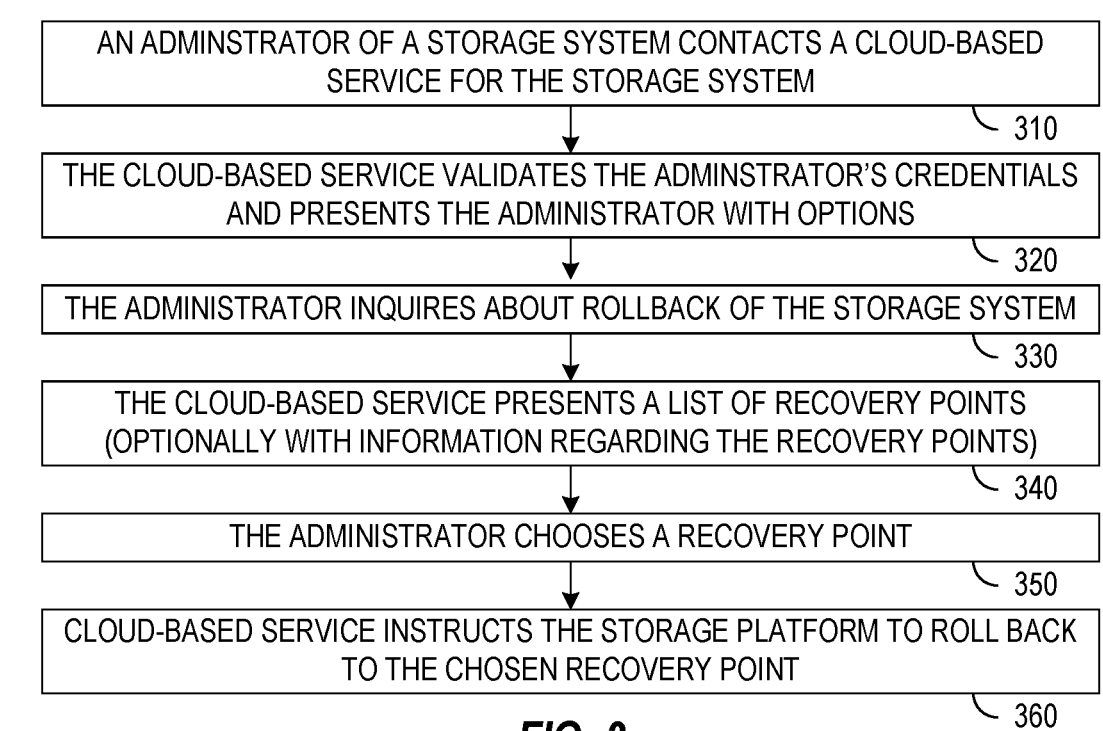
FIG. 3 is a flow diagram of a process in which a user or administrator seeking recovery of a storage system contacts a cloud-based service in accordance with an example of the present disclosure.

FIG. 3 is a flow diagram of a recovery process 300 for a cluster storage system in accordance with an example of the present disclosure. Process 300 may begin with a process 310 where an administrator or other user of a storage system contacts a cloud-based service. For example, for storage platform 100 of FIG. 1, an administrator using a network-connected user device 164 may run a browser or other application to contact management service 182 of cloud-based infrastructure 180, and the application running on user device 164 may present the administrator with a user interface 165 through which the administrator may communicate with management service 182. When presented with a user interface, the administrator, in a process 320, may log in or provide credentials indicating that the administrator is authorized to administer the storage system and may then inquire, in process 330, about recovery operations. Once the administrator is authenticated, the administrator, in process 330, inquires about rolling back the storage system, and the cloud-based service, in a process 340, presents the user with a list of available recovery points for the storage system. In storage platform 100, for example, management service 182 may access platform data 184 that indicates M synchronized sets S1-1 . . . S1-M to SN-1 to SN-M are available and present the user with M recovery point options. In some examples of the present disclosure, platform data 184 may have obtained information regarding synchronized snapshots during prior normal operations of storage platform 100. In other examples, management service 182 may contact SPUs 120-1 to 120-N and obtain information on synchronized snapshot sets when the administrator inquires about recovery operations. Optionally, cloud-based management service 182 may aid the user in selecting a recovery point by providing information such as the entropy or compressibility of the available snapshots. A data of a snapshot having high entropy or low compressibility may suggest that the data is encrypted and may suggest ransomware activity occurred before that snapshot was taken. Entropy and compressibility are, however, just examples of information that may be useful to an administrator choosing a recovery point.

In a process block 350, the administrator may pick a point in time or a recovery point (RP1) to from the list of options. When using a graphical user interface, the cloud-based service 182 may require a double-confirmation from the administrator before continuing because a rollback is a potentially destructive action when done at the wrong time for the wrong reasons. Once the recovery point is chosen and confirmed, the cloud-based service, in a process 360, instructs the storage system to rollback volumes to the snapshots corresponding to the chosen recovery point.

FIG. 4 is a flow diagram of a process 400 in which a storage processing system, particularly storage platform 100 of FIG. 1, performs a recovery operation. In an initiation process 410, cloud-based service 182 instructs the storage platform 100 to rollback volumes to a recovery point RP1. In alternative examples, the rollback may be for all types of virtual volumes or may exclude some volumes such as boot volumes. In some cases, boot volumes BT1 to BTN may be rolled back to a target milestone that ensures a stable operable system, and the milestone may or may not be at the same time as the recovery point RP1 for other virtual volumes V1 to VN. For processes 410, cloud-based service 182 may contact a single SPU 120, e.g., SPU 120-1, that may act as a rollback coordinator, and the rollback coordinator 120-1 may communicate instructions to the other SPUs 120 in storage platform 100 for a system-wide rollback. Alternatively, cloud-based service 182 or the rollback coordinator 120-1 may instruct one SPU 120 or any subset of the SPUs 120 to rollback if the desired recovery operation is targeting just the volumes associated with subset of SPUs 120.

Each SPU 120, upon receiving instructions for the rollback to recovery point RP1 suspends, in a process 420, the acceptance of new storage service requests from clients and completes any storage service operations that may be in progress. Once all SPUs 120 have completed any pending storage operations, the SPUs 120 may inform rollback coordinator SPU 120-1 if there is one, and the rollback coordinator SPU 120-1 may instruct all or the selected SPUs 120 to create snapshots for all their volumes with current data as a new recovery point (RP2). All or the selected SPUs 120 perform a process 430 to snapshot the current state of their volumes.

All er of the selected SPUs 120, in a promote process 440, promote their sets of synchronized snapshots corresponding to the selected recovery point RP1. For each of the snapshots corresponding to recovery point RP1, promote operation 440 may be an XCOPY operation started from the selected recovery point (RP1) snapshot to the corresponding base volume. In a process block 450, SPUs 120 may resume accepting storage service requests from storage clients once the chosen snapshots have been promoted. Servers 110 may reboot in a reboot process 460 from stable boot volumes with data volumes being rolled back to recovery point RP1. If redfish or a similar functionality with host servers 110 is enabled, the SPUs 120 may trigger reboots of servers 110. Otherwise, the user may manually reboot servers 110 using the server's lights out tools. SPUs 120 may "wait" for the host servers 110 to reboot, i.e., for a host reset. Once the reboot is observed, SPUs 120 allow or unblock access to volumes V1 to VN, which are then in the state of recovery point RP1. If this state is not what the user wanted, the user can perform the recovery process again and rollback to any of the other available recovery points including the recovery point RP2 that storage platform 100 had before rolling back to recovery point RP1.

Rollback process 400 can also address special cases in which the number or characteristics of volumes may have changed after the last synchronized set of snapshots. One special case is where a volume was created between the time when the last snapshots were created and the time when the rollback was initiated. For example, if storage platform 100 last created a synchronized set of snapshots one hour ago but created a new volume 30 minutes ago then the volume created 30 minutes ago may be preserved in a possibly corrupted state or may be deleted. To avoid this situation, storage platform 100 may be operated to take a set of synchronized snapshots not only at scheduled times but also immediately after creating or provisioning any new volumes.

Rollback process 400 generally uses a set of snapshots, e.g., one of sets S1 to SM, that are synchronized to a point in time or along series of an I/O operations. If the set of snapshots that are selected for a rollback process 400 are not synchronized across storage platform 100, the rollback operation 400 could result in storage platform 100 being in an inconsistent state, particularly for applications using multiple volumes. A process for taking synchronized snapshots such as process 300 of FIG. 3 may thus need to prevent rollback process 400 putting storage platform 100 in a possibly inconsistent state. If data inconsistency is not an issue, the snapshots do not necessarily need to be synchronized. For example, VMware may not be affected data inconsistency if VMs have their vmdk files on a single datastore. Other applications such as databases may require specific application integrations to make them consistent, and time-consistent snapshots across the SPUs 120-1 (o 120-N may still not be good enough if different hosts flush their data at different times, so I/O synchronization may be needed.

Processes 300 and 400 may also work with read-write snapshots, which are snapshots that presented for storage services such as read or write requests from storage clients. In particular, processes 300 and 400 may simply treat read-write snapshots the same as base volumes. In particular, process 300 when taking a synchronized set of snapshots may include snapshotting any read-write snapshots, and rollback process 400 may include rolling back any read-write snapshots.

All or portions of some of the above-described systems and methods can be implemented in a computer-readable media, e.g., a non-transient media, such as an optical or magnetic disk, a memory card, or other solid state storage containing instructions that a computing device can execute to perform specific processes that are described herein. Such media may further be or be contained in a server or other device connected to a network such as the Internet that provides for the downloading of data and executable instructions.

Although particular implementations have been disclosed, these implementations are only examples and should not be taken as limitations. Various adaptations and combinations of features of the implementations disclosed are within the scope of the following claims.

What is claimed is:

1. A process for operating a storage system including a plurality of servers containing a plurality of service processing units (SPUs), the process comprising:
   creating a first snapshot set, the first snapshot set including a plurality of first snapshots respectively of a plurality of volumes that the SPUs maintain for storage services, the first snapshots capturing respective states that the volumes have at a first time;
   creating a second snapshot set, the second snapshot set including a plurality of boot volume snapshots respectively of a plurality of boot volumes at a second time when a verified operating system image is written to the plurality of boot volumes;
   reporting, by the storage system, the first snapshot set and the second snapshot set to a cloud-based service;
   receiving, from a user of the storage system, communication to the cloud-based service about a recovery of the storage system;
   providing for presentation to the user a list of recovery points, the recovery points including a first recovery point corresponding to the first time and a second recovery point corresponding to the second time, each recovery point corresponding to one or more snapshots of the plurality of volumes;
   receiving from the user a selection to recover the storage system to the first recovery point, the first recovery point corresponding to the first snapshots; and
   in response to the selection from the user, promoting the first snapshots to replace the volumes that SPUs present for storage services.

2. The process of claim 1, wherein the process further comprises creating a third snapshot set, the third snapshot set including a plurality of third snapshots respectively of the plurality of volumes, the third snapshots capturing respective states that the volumes have at a third time, wherein the list of recovery points presented to the user further includes a third recovery point corresponding to the third time.

3. The process of claim 2, further comprising instructing each of the SPUs to perform a snapshot operation at times indicated by a schedule, wherein:
   each performance of the snapshot operation including each of the SPUs snapshotting each of the volumes that the SPU exports;
   the schedule includes the first time and the third time;
   the first snapshot set is results of the SPUs performing the snapshot operation at the first time; and
   the third snapshot set is results of the SPUs performing the snapshot operation at the third time.

4. The process of claim 1, wherein the process further comprises receiving communication from the user to communicate with the cloud-based service about recovery while the volumes are corrupted or encrypted.

5. The process of claim 1, wherein when the cloud-based service presents the list, the cloud-based service also provides to the user information indicating whether the first snapshots appear to be corrupted or encrypted.

6. The process of claim 1, wherein creating the first snapshot set comprises performing, by each of the SPUs, a snapshot operation that includes:
   suspending incoming storage service requests;

completing pending storage operations for prior storage service requests to the SPU;

creating the first snapshots of the volumes that the SPU maintains; and resuming acceptance of incoming storage requests to the SPU.

7. The process of claim 6, wherein each of the SPUs creates the first snapshots of the volumes without copying data of the volumes.

8. The process of claim 1, wherein the promoting of snapshots comprises promoting, by the SPUs, their respective volumes, thereby rolling back an entire cluster of storage nodes associated with the SPUs.

9. A cluster storage system comprising: a plurality of storage nodes each storage node including:

a server;

a backend storage device; and an SPU (storage processing unit) connected to the backend storage device, the SPU operating the backend storage to provide storage services for a plurality of virtual volumes, wherein the SPU is configured to execute a first process including:

performing a snapshot operation at times indicated by a cluster-wide schedule, each performance of the snapshot operation including the SPU snapshotting each of the volumes that the SPU exports and thereby creating a synchronized snapshot set associated with the time of the snapshotting, wherein at least one snapshot operation includes creating a plurality of boot volume snapshots at a time when a verified operating system image is written to the plurality of boot volumes;

the SPUs are configured to respond to instructions from a cloud-based service by promoting the snapshots of a selected one of the synchronized snapshot sets to recover the cluster storage system to a state it had at the time associated with the synchronized set, wherein the instructions are based on a user selection from a list of recovery points, the user selection indicating the time as a recovery point.

10. The cluster storage system of claim 9, wherein the SPUs are configured to send information regarding the synchronized snapshot sets to the cloud-based service.

11. A system, comprising at least one processor and memory storing instructions for executing steps, the steps comprising:

creating a first snapshot set, the first snapshot set including a plurality of first snapshots respectively of a plurality of volumes that a plurality of SPUs (storage processing units) maintain for storage services, the first snapshots capturing respective states that the volumes have at a first time;

creating a second snapshot set, the second snapshot set including a plurality of boot volume snapshots respectively of a plurality of boot volumes at a second time when a verified operating system image is written to the plurality of boot volumes;

reporting the first snapshot set and the second snapshot set to a cloud-based service;

receiving, from a user of a storage system, communication to the cloud-based service about a recovery of the storage system;

providing, for presentation to the user, a list of recovery points, the recovery points including a first recovery point corresponding to the first time and a second recovery point corresponding to the second time, each recovery point corresponding to one or more snapshots of the plurality of volumes;

receiving, from the user, a selection to recover the storage system to the first recovery point, the first recovery point corresponding to the first snapshots; and in response to instructions from the cloud-based service associated with the selection, promoting the first snapshots to replace the volumes that SPUs present for storage services.

12. The system of claim 11, wherein the steps further comprise creating, by the SPUs, a third snapshot set, the third snapshot set including a plurality of third snapshots respectively of the plurality of volumes, the third snapshots capturing respective states that the volumes have at a third time, wherein the list of recovery points presented to the user further includes a third recovery point corresponding to the third time.

13. The system of claim 12, wherein the instructions further comprise instructing each of the SPUs to perform a snapshot operation at times indicated by a schedule, wherein:

each performance of the snapshot operation includes each of the SPUs snapshotting each of the volumes that the SPU exports;

the schedule includes the first time and the third time;

the first snapshot set is results of the SPUs performing the snapshot operation at the first time; and the third snapshot set is results of the SPUs performing the snapshot operation at the third time.

14. The system of claim 12, wherein the steps further comprise receiving communication from the user to communicate with the cloud-based service about recovery while the volumes are corrupted or encrypted.

15. The system of claim 11, wherein when the cloud-based service presents the list, the cloud-based service also provides to the user information indicating whether the first snapshots appear to be corrupted or encrypted.

16. The system of claim 11, wherein creating the first snapshot set comprises performing, by each of the SPUs, a snapshot operation that includes:

suspending incoming storage service requests;

completing pending storage operations for prior storage service requests to the SPU;

creating the first snapshots of the volumes that the SPU maintains; and resuming acceptance of incoming storage requests to the SPU.

17. The system of claim 16, wherein each of the SPUs creates the first snapshots of the volumes without copying data of the volumes.

18. The system of claim 11, wherein the promoting of snapshots includes all the SPUs promoting their respective volumes in response to the instructions from the cloud-based service, thereby rolling back an entire cluster of storage nodes associated with the SPUs.

19. The system of claim 11, wherein the steps further comprise deleting one or more snapshots of volumes that are not boot volumes.

20. The system of claim 19, wherein the one or more deleted snapshots are disqualified from providing a possible recovery point.

* * * * *